US008059342B2

(12) United States Patent
Burke (10) Patent No.: US 8,059,342 B2
(45) Date of Patent: Nov. 15, 2011

(54) BEAM SEGMENTOR FOR ENLARGING VIEWING APERTURE OF MICRODISPLAY

(75) Inventor: Elliot Burke, Goleta, CA (US)

(73) Assignee: Vuzix Corporation, Rochester, NY (US)

( * ) Notice: Subject to any disclaimer, the term of this patent is extended or adjusted under 35 U.S.C. 154(b) by 46 days.

(21) Appl. No.: 12/418,318

(22) Filed: Apr. 3, 2009

(65) Prior Publication Data

US 2010/0254018 A1    Oct. 7, 2010

(51) Int. Cl.
  G02B 27/14    (2006.01)
  G09G 5/00     (2006.01)
  F21V 7/04     (2006.01)
(52) U.S. Cl. ............. 359/630; 359/636; 345/8; 362/558
(58) Field of Classification Search .......... 359/629–636; 345/7–9; 362/551, 560, 346, 558
  See application file for complete search history.

(56) References Cited

U.S. PATENT DOCUMENTS

| | | |
|---|---|---|
| 5,076,664 A | 12/1991 | Migozzi |
| 5,453,877 A | 9/1995 | Gerbe et al. |
| 5,880,888 A | 3/1999 | Schoenmakers et al. |
| 5,973,727 A | 10/1999 | McGrew et al. |
| 6,072,551 A | 6/2000 | Jannson |
| 6,181,367 B1 | 1/2001 | McGrew et al. |
| 6,825,987 B2 | 11/2004 | Repetto et al. |
| 6,829,095 B2 | 12/2004 | Amitai |
| 7,391,573 B2 | 6/2008 | Amitai |
| 7,453,612 B2 | 11/2008 | Mukawa |
| 7,457,040 B2 | 11/2008 | Amitai |
| 7,577,326 B2 | 8/2009 | Amitai |
| 2003/0165017 A1 | 9/2003 | Amitai |
| 2004/0033528 A1 | 2/2004 | Amitai |
| 2005/0276065 A1* | 12/2005 | Saccomanno et al. ........ 362/558 |
| 2006/0215244 A1 | 9/2006 | Yosha et al. |
| 2008/0025667 A1 | 1/2008 | Amitai |
| 2008/0094586 A1 | 4/2008 | Hirayama |
| 2008/0151379 A1 | 6/2008 | Amitai |
| 2008/0186604 A1 | 8/2008 | Amitai |
| 2008/0198471 A1 | 8/2008 | Amitai |
| 2008/0239420 A1 | 10/2008 | McGrew |
| 2009/0015929 A1 | 1/2009 | DeJong et al. |

FOREIGN PATENT DOCUMENTS

| | | |
|---|---|---|
| EP | 1566682 A1 | 3/2003 |
| JP | 2006350129 | 12/2006 |
| WO | 2009074638 A2 | 6/2009 |

OTHER PUBLICATIONS

International Search Report and Written Opinion in corresponding PCT/US2009/069910 application mailed Jul. 30, 2010 (8 pages).

* cited by examiner

*Primary Examiner* — Alicia M Harrington
(74) *Attorney, Agent, or Firm* — Stephen B. Salai, Esq.; Harter Secrest & Emery LLP (57) ABSTRACT

A display platform orients a virtual image in alignment with a viewer's eye. A transmissive plate receives a light beam conveying the virtual image into the transmissive plate for propagation by internal reflection between inner and outer surfaces of the transmissive plate along the length of the transmissive plate. A plurality of reflective facets progressively interrupt the propagation of the light beam along the length of the transmissive plate for reflecting successive portions of the light beam in a direction for rendering the virtual image visible to the viewer.

23 Claims, 7 Drawing Sheets

BEAM SEGMENTOR FOR ENLARGING VIEWING APERTURE OF MICRODISPLAY

TECHNICAL FIELD

The invention relates to microdisplay systems, particularly such systems arranged to produce magnified virtual images of patterns produced by microdisplay engines and to such systems that can be arranged for near-eye viewing within head-mounted frames or that can be arranged for viewing within prescribed eyeboxes.

BACKGROUND OF THE INVENTION

Microdisplays generally produce magnified virtual images of patterns formed by microdisplay engines, which typically function as spatial light modulators for patterning light from external sources or as self-illuminators that produce patterns of light from arrays of controllable internal sources. Technologies employed for spatial light modulation include liquid crystal diode (LCD), liquid crystal on silicon (LCoS), or digital light processing (DLP). Self-illuminating display engines can be based on organic light-emitting diode technology (OLED).

Focusing systems of the microdisplays magnify the patterns formed by the microdisplay engines as virtual images that are visible within limited regions of space referred to as "eyeboxes". In binocular microdisplay systems, separate eyeboxes are provided for each eye. Eyeboxes larger than the typical viewer's eye pupil size can waste light but can accommodate relative displacements between the viewer's eyes and the microdisplays as well as variations in viewer's interpupillary distances for binocular systems.

The microdisplay engines and associated optics of wearable near-eye microdisplays are generally positioned out of the viewer's line of sight for both functional and aesthetic reasons. Non-immersive microdisplays preserve line-of-sight views of the ambient environment. Beamsplitters along the line-of sight admit light from the ambient environment while folding the light paths from the microdisplay engines into alignment with the line of sight. The folded light paths of the microdisplays provide for designs that are more compact. For example, the required focal lengths of the powered optics are generally achieved by locating the microdisplay engines at a distance above or to the side of the viewer's eyes along folded light paths.

The transverse height and width of the light beam at the exit pupil of the microdisplay required for filling the eyebox influence the size of the optics in corresponding dimensions. In a folded system, where a beamsplitter redirects light from the microdisplay engine to the viewer's eye from one side of the viewer's eye, the thickness of the microdisplay in front of the eye is influenced by the required beam width. Prior to folding, the dimension of the beamsplitter along the line of sight is generally sized to accommodate the beam width.

A longstanding goal of wearable near-eye microdisplays has been to limit the thickness of the microdisplays in front a viewer's eyes so as to resemble conventional eyeglasses more closely. Thinner displays are also desirable for other purposes, including for purposes of integration with other devices such as hand-held electronic devices.

Attempts have been made to provide substrate-guided beam expanders in front of viewers' eyes to convey image-bearing light beams toward viewers' eyes from off-axis positions by total internal reflection and to reorient the light beams in alignment with the viewers' lines of sight through a series of partial reflections that effectively expand the light beams in the width direction. Each in the series of partially reflective interfaces within a guided substrate redirects a portion of a light beam's energy in a direction generally toward the viewer's eye. The partial reflections disperse the light beam's energy in the width direction to fill the desired eyeboxes.

Such beam expanders containing internal partially reflective interfaces are difficult to manufacture and are subject to problems such as ghost imaging or angular sensitivities at interfaces that complicate requirements for directing light rays in desired directions.

SUMMARY OF THE INVENTION

The invention, among its preferred embodiments, contemplates guiding a light beam from a microdisplay engine along a transmissive plate and reflecting the light beam out of the transmissive plate in stages for filling an eyebox within which a virtual image of patterns produced by the microdisplay engine are visible. The guided light beam is reflected in stages by a succession of reflective facets each sized for reflecting only a limited portion of the original transverse area of the light beam. Each facet can provide for specularly reflecting a unique portion of the transverse area of the light beam corresponding to a certain range of angles emanating from each pixel of the microdisplay engine. Preferably, each facet is similarly oriented so that the different transverse portions of the light beam are reflected in directions consistent with a reflection of the light beam from a single plane mirror but segmented into relatively shifted positions to fill the desired eye box.

The successive specular reflections of the propagating light beam obviate requirements for a much larger mirror and focusing optics to reflect a beam sized to fill the desired eyebox. Thus, the transmissive plate with the reflective facets can be made much thinner than otherwise required for a single beamsplitter or plane mirror for redirecting light to a viewer's eye. The reflective facets are also spaced apart so that the transmissive plate remains at least partly transmissive in the viewing direction for viewing the ambient environment.

Where a requirement for external viewing is paramount, the reflective facets can be limited to peripheral portions of the field of view such as in the form of strips or banners conveying information for aiding in the performance of tasks. Banners of limited width can be produced with limited size focusing optics, but viewable through a range of eye positions within an extended eyebox.

One expression of the invention as a microdisplay system includes a microdisplay engine having individually addressable pixels that form a pattern within a light beam. A focuser forms within the light beam a virtual image of the pattern produced by the microdisplay engine and has an exit pupil through which light from the individually addressable pixels is substantially collimated in unique directions. A transmissive plate adapted to receive the light beam has inner and outer surfaces separated by a thickness for propagating the light beam between the inner and outer surfaces along a length of the transmissive plate by internal reflection. A plurality of reflective facets are both (a) spaced apart from each other along the length of the transmissive plate and (b) relatively sized in reflective area so as to reflect different transverse sections of the substantially collimated light from the individually addressable pixels through the inner surface of the transmissive plate for extending an eyebox within which the virtual image is viewable.

Preferably, the reflective facets are (a) specularly reflective, (b) inclined through an inclination angle with respect to the outer surface of the transmissive plate, and (c) offset from the inner surface of the transmissive plate. Also under preferred circumstances, the substantially collimated light from each of the individually addressable pixels internally reflects from the inner and outer surfaces through unique grazing angles, and the inclination angle of the reflective facets is no greater than the grazing angles of the substantially collimated light from the individually addressable pixels.

The inclination angle of the reflective facets can be set to reflect the substantially collimated light from one of the individually addressable pixels substantially normal to at least one of the inner and outer surfaces. In addition, the inclination angle of the reflective facets is preferably no more than 30 degrees so as to allow light to escape in a direction normal to the inner and outer surfaces from reflective facets inclined by at least the grazing angle of the otherwise internally reflecting beam.

A coupler is preferably provided for injecting the light beam into the transmissive plate for internally reflecting the light beam from the inner and outer surfaces along the length of the transmissive plate at a nominal grazing angle. The thickness of the transmissive plate is limited in relation to the nominal grazing angle and a transverse width of the light beam so that the successive internal reflections of the light beam encounter substantially contiguous portions of the inner and outer surfaces.

The reflective facets are preferably formed through the outer surface of the transmissive plate and are provided with a coating to reflect the substantially collimated light from the individually addressable pixels. The coating is preferably a metalized coating but could also be an angularly sensitive coating that reflects light through a range of angles at which the substantially collimated light from the individually addressable pixels is incident upon the reflective facets.

To better assure that light propagating along the length of the transmissive plate does not escape through the outer surface of the transmissive plate, the outer surface of the transmissive plate can be made reflective through a greater range of grazing angles than the inner surface of the transmissive plate. For example, the effective critical angle of the outer surface can be decreased in relation to the effective critical angle of the inner surface, or the effective critical angle of the inner surface can be increased in relation to the effective critical angle of the outer surface.

In general, the substantially collimated light from the individually addressable pixels internally reflects from the inner surface of the transmissive plate at a first range of incidence angles. The reflective facets reflect the different transverse sections of the substantially collimated light from the individually addressable pixels along a path through the inner surface of the transmissive plate at a second range of incidence angles. To better distinguish between the two angular ranges, the inner surface can be coated with an angularly sensitive coating that contributes to the reflection of light from the inner surface within the first range of incidence angles and contributes to a transmission of light through the inner surface within the second range of incidence angles. The outer surface of the transmissive plate can be coated with an angularly sensitive coating that contributes to the reflection of light from the outer surface within the first range of incidence angles or beyond.

One particular implementation divides the transmissive plate into a transmissive central portion devoid of the reflective facets for transmitting ambient light at a center of a viewer's field of view and a peripheral portion containing the reflective facets for presenting the virtual image within a periphery of the viewer's field of view. Banner messages, including sensor readings, can be presented as virtual images within the periphery of the viewer's field of view.

Another expression of the invention as a display plate for orienting a virtual image in alignment with a viewer's eye includes a transmissive plate having inner and outer surfaces separated by a thickness of the transmissive plate and extending along a length of the transmissive plate. The transmissive plate is adapted to receive a light beam conveying the virtual image into the transmissive plate for propagation by internal reflection between the inner and outer surfaces of the transmissive plate along the length of the transmissive plate, A plurality of reflective facets progressively interrupt the propagation of the light beam along the length of the transmissive plate. The reflective facets are (a) inclined through an inclination angle with respect to the outer surface of the transmissive plate, (b) offset from the inner surface of the transmissive plate, and (c) spaced apart from each other along the length of the transmissive plate for reflecting successive portions of the light beam in a direction that transmits the successive portions of the light beam through the inner surface of the transmissive plate for rendering the virtual image visible to the viewer.

The light beam is preferably injected into the transmissive plate by a coupler through a considered range of grazing angles, each grazing angle within the considered range being low enough to support the internal reflection the light beam from at least one of the inner and outer surfaces. The reflective facets can be arranged to interrupt the outer surface of the transmissive plate, and the inclination angle of the reflective facets with respect to the outer surface is preferably limited to no greater than a lowest of the grazing angles within the considered range. With the reflective facets inclined less than the grazing angles, the internal reflections of the light beam from the outer surface do not encounter the reflective facets en route to the inner surface of the transmissive plate. As preferably constructed, none of the propagating light passes through the reflective facets.

The inclination angle of the reflective facets can be related to a nominal grazing angle of the light beam so that the portions of the light beam that encounter the reflective facets at the nominal grazing angle are reflected in a direction substantially along a normal to at least one of the inner and outer surfaces. An interface at the inner surface of the transmissive plate can be arranged to exhibit a critical angle of incidence for supporting a total internal reflection of the light beam and the nominal grazing angle is preferably no greater than a complement of the critical angle and no less than the inclination angle of the reflective facets. In addition, the nominal grazing angle is preferably not less than 30 degrees corresponding to a nominal incidence angle of not more than 60 degrees with respect to the normal to the outer surface. A complement of the nominal grazing angle is preferably approximately equal to two times the inclination angle of the reflective facets.

The inner and outer surfaces of the transmissive plate preferably extend substantially parallel to maintain a substantially constant nominal grazing angle along the length of the transmissive plate. An interface of the inner surface can be arranged to exhibit a critical angle of incidence for supporting a total internal reflection of the light beam, and the considered range of grazing angles is preferably less than a difference between a complement of the inclination angle and the critical angle. The critical angle is preferably less than 40 degrees.

Preferably, the reflective facets share a common inclination angle for functioning as displaced segments of a plane mirror. Both the spacing and the sizes of the reflective facets can be varied along the length of the transmissive plate to control the distribution of light within the eyebox. Generally, a substantially even distribution of light is preferred throughout the eyebox. For example, the reflective facets can be spaced apart by amounts that progressively decrease along the length of the transmissive plate in the direction of propagation. Alternatively, the areas of the facets can progressively increase along the length of the transmissive plate in the direction of propagation. In addition, the reflective facets can be both variably spaced and variably sized along the length of the transmissive plate to reproduce the virtual image throughout a range of positions within an eyebox projecting from the inner surface of the transmissive plate.

Preferably, the coupler has an entrance face sized in relation to the thickness of the transmissive plate so that successive internal reflections of the light beam encounter substantially contiguous portions of the inner and outer surfaces. To limit chromatic dispersion, the entrance face of the coupler can be oriented substantially normal to an instant propagating direction of the light beam incident upon the entrance face of the coupler and the reflective facets can be oriented so that the light beam exits the inner surface of the transmissive plate substantially normal to an instant propagating direction of the light beam incident upon the inner surface of the transmissive plate. Preferably, both the coupler and the transmissive plate share a common refractive index.

The transmissive plate can formed as a part of a molded resin body that also forms a contiguous headgear frame for supporting the transmissive plate in a near-eye position. For example, the molded resin body can include a bridge for supporting the transmissive plate on the viewer's nose.

DETAILED DESCRIPTION OF THE INVENTION

Figure 1:
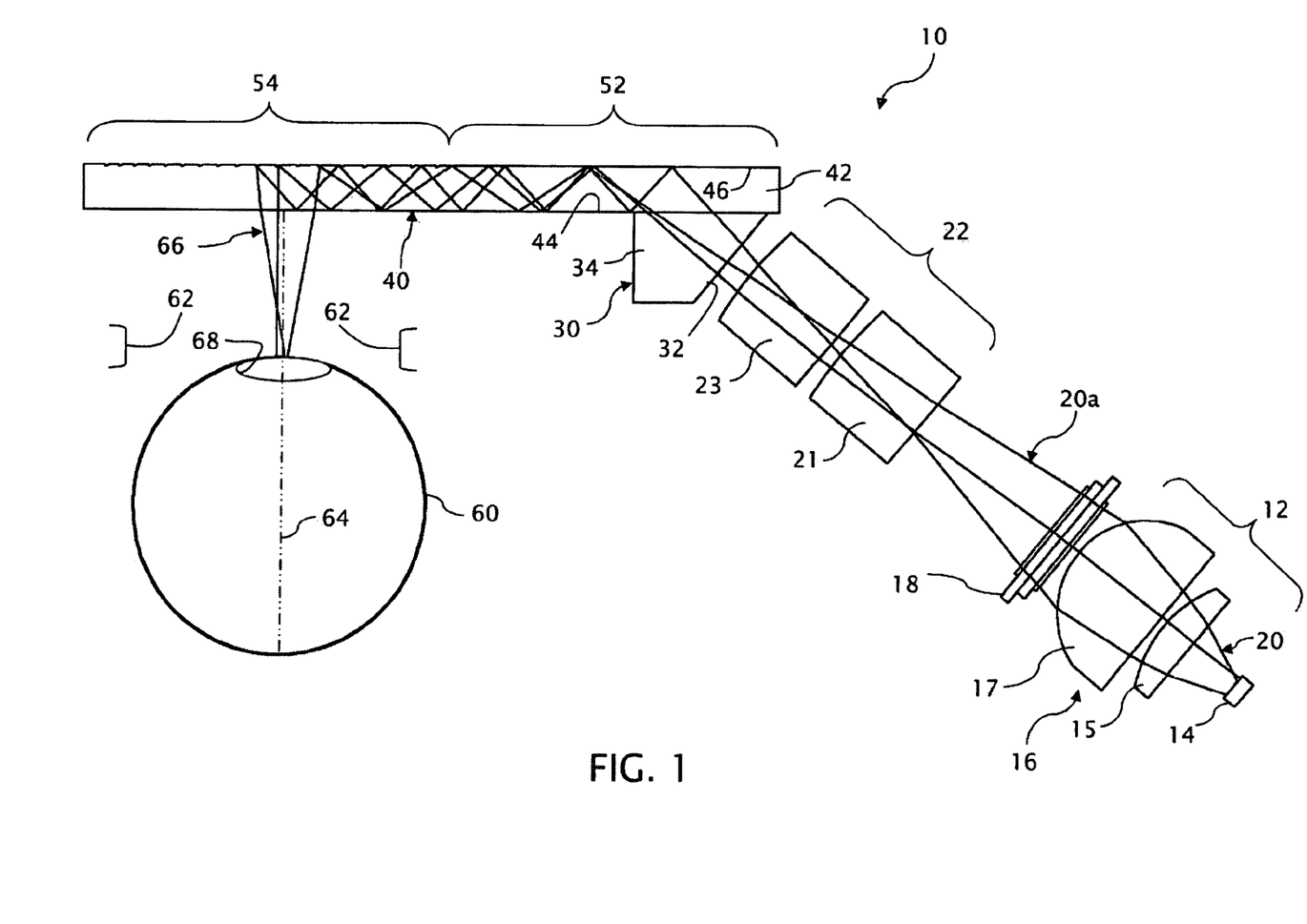
FIG. 1 is a diagram of a microdisplay system in accordance with the invention shown in a side view.

A general optical layout of a microdisplay 10 arranged in accordance with the invention as shown in FIG. 1 includes an illuminator 12 for illuminating a spatial light modulator 18, which produces light patterns in accordance with a video signal not shown. The illuminator 12, which is also shown in the enlarged orthogonal views of FIGS. 2A and 2B, includes a light source 14 and a condenser 16. The light source 14, which emits an expanding light beam 20, can be formed by one or more light emitting diodes, or other sources including lamps known for illuminating spatial light modulators or other microdisplay engines.

The condenser 16 includes one or more optical elements, such as a PCX (plano-convex) lens 15 for collecting light from the expanding beam 20 and a cylindrical lens 17 for reshaping the expanding beam 20 in one orthogonal direction with respect to another. That is, the cylindrical lens 17 is oriented to confine the dimensions of the light beam 20 in the common plane of FIGS. 1 and 2A as a light beam component $20a$ while allowing a further expansion of the light beam 20 in the orthogonal plane of FIG. 2B as the light beam component $20b$. After passing through imaging lens 22 shown as doublets 21 and 23, the beam component $20a$ converges through a pupil $28a$ well in advance of the beam component $20b$, which converges farther along a common optical axis 24 through a pupil $28b$ having a larger transverse dimension. Other adjustments known in the art can be made to the illuminator 12 to achieve desired spectral and spatial distributions of light as well as downstream energy distributions within the pupils $28a$ and $28b$.

Figure 2A:
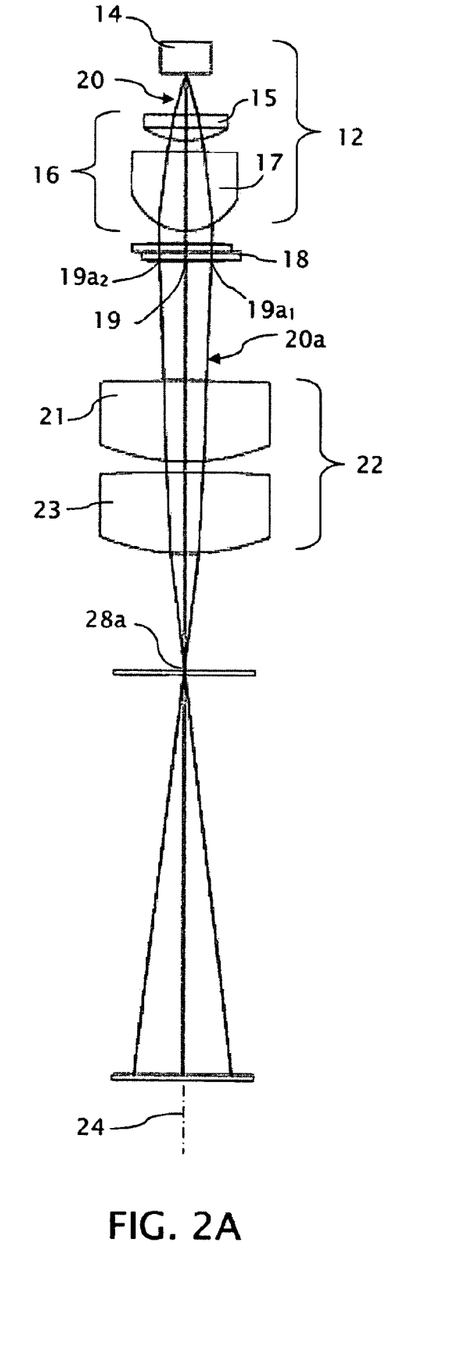
FIGS. 2A and 2B are diagrams of a front end of the microdisplay system from an illuminator through a focuser, showing the progress of light rays in the two orthogonal planes associated with both on-axis and off-axis pixels addressable by a spatial light modulator.
Figure 2B:
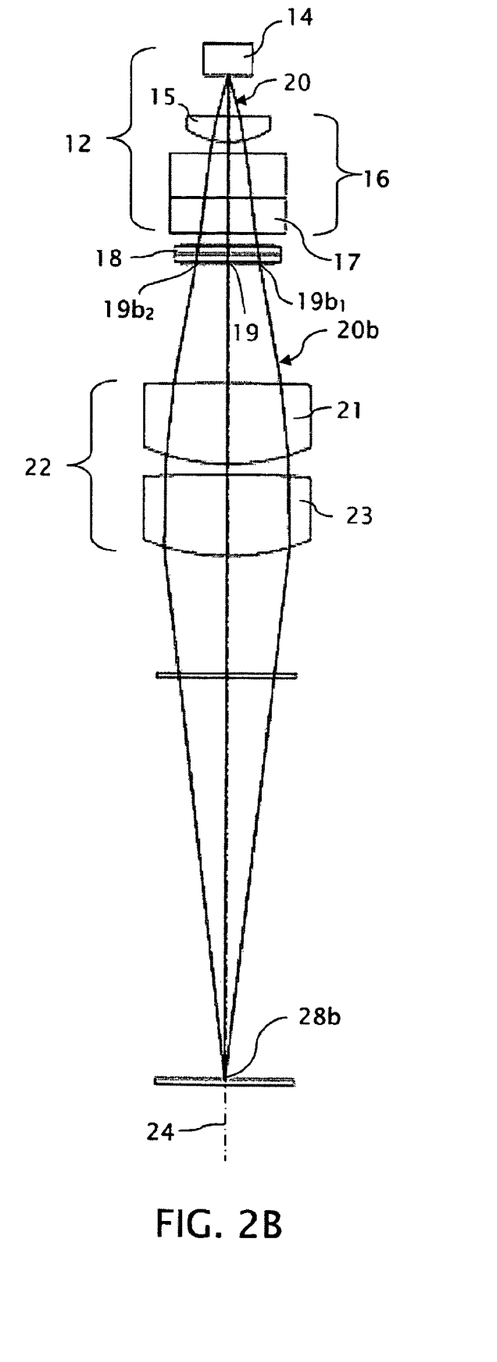

The spatial light modulator 18, which functions together with the illuminator 12 as a microdisplay engine, preferably comprises a controllable array of liquid crystal diodes, providing individually addressable pixels, such as pixels 19, $19a_1$, $19a_2$, $19b_1$, and $19b_2$ shown in the orthogonal planes of FIGS. 2A and 2B, for producing the desired light patterns within a light beam 20 in response to the video signal. Other spatial light modulators useful for purposes of the invention include grating light valve (GLV) technologies and digital light processing (DLP) technologies such as digital micromirror devices (DMD). The illuminator 12 and the spatial light modulator 18 could also be replaced by a self-illuminating microdisplay engine in which the addressable pixel elements are themselves individually controllable light sources such as known from organic light-emitting diode technologies (OLED).

Figure 3A:
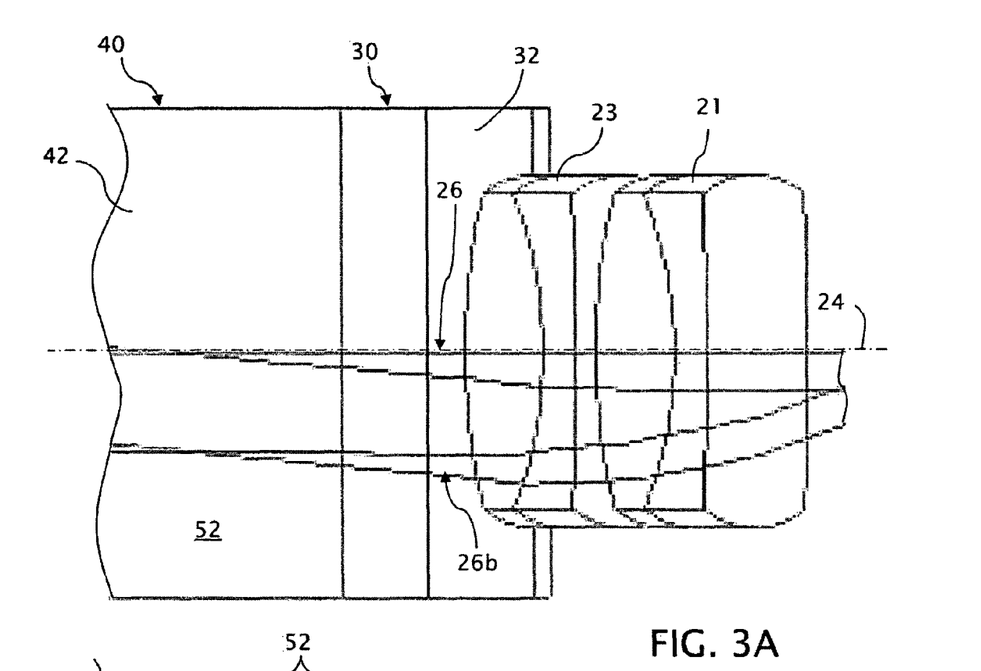
FIGS. 3A and 3B are similar relatively enlarged diagrams of a mid-portion of the microdisplay in orthogonal axial planes showing the injection of a light beam through a coupler into a transmissive plate.
Figure 3B:
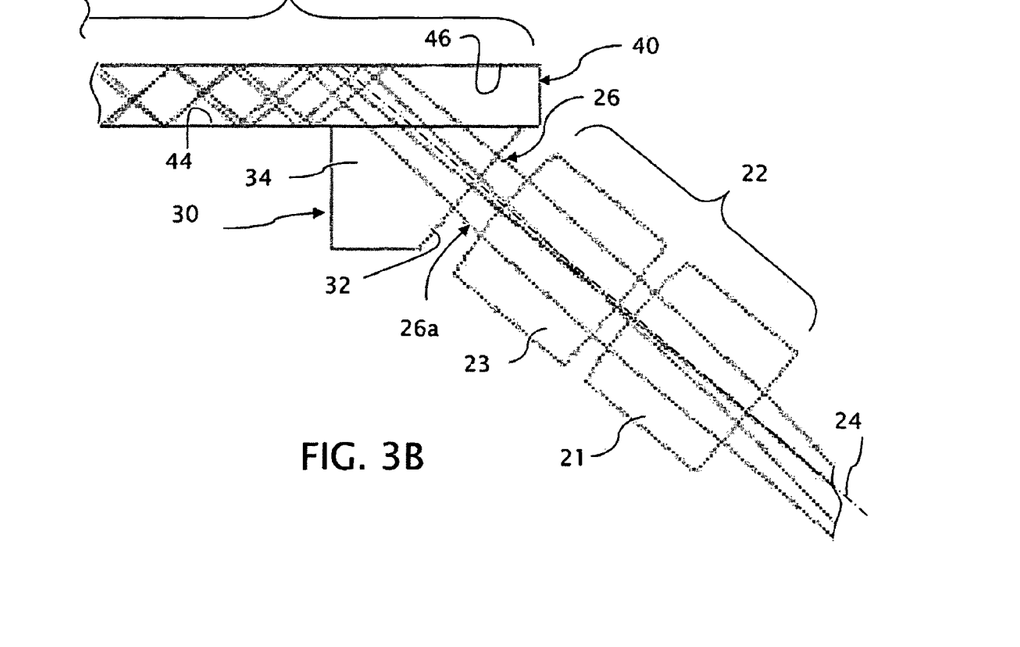

As shown in FIGS. 3A and 3B, the imaging lens 22, as a type of focusing optic, functions largely as a collimator for converting bundles of rays emitted from individual pixels, such as the pixels 19, $19a_1$, and $19b_1$ of the spatial light modulator 18 into substantially collimated beamlets 26, $26a$, and $26b$ oriented in unique directions according to the locations of the pixels 19, $19a_1$, and $19b_1$ within the spatial light modulator 18. In other words, the individual pixels 19, $19a_1$, and $19b_1$ of the spatial light modulator 18 function substantially as point light sources, and the relative displacement of the individual pixels 19, $19a_1$, and $19b_1$ from an optical axis 24 of the imaging lens 22 affects the angle through which the corresponding beamlets 26, $26a$, and $26b$ are collimated.

Although the beamlets 26, $26a$, and $26b$ are regarded as substantially collimated for presenting a virtual image of the light pattern produced by the spatial light modulator 18, the beamlets 26, 26a, and 26b preferably slightly diverge so that the virtual image produced by the imaging lens 22 appears at a finite distance, such as at two to four meters from the intended viewer, instead of at a distance approaching infinity. In addition, although the substantially collimated beamlets 26, 26a, and 26b individually slightly diverge, the orthogonal light beam components 20a and 20b focused by the imaging lens 22 collectively converge through respective exit pupils 28a and 28b, which is apparent in the views of FIGS. 2A and 2B.

Referring again to FIGS. 3A and 3B, the beamlets 26, 26a, and 26b are injected into a transmissive plate 40 for accomplishing a number of functions, including conveying the beamlets 26, 26a, and 26b to a position near an intended line of sight 64 of a viewer's eye 60 (see FIG. 1) and reorienting the beamlets 26, 26a, and 26b in alignment with the intended line of sight 64. Non-immersive versions of the microdisplay 10 require preserving the line of sight 64 through the transmissive plate 40 to the ambient environment. The pupil 28b taken in the plane of FIG. 2B is preferably located nearly coincident with a pupil 68 of the viewer's eye 60 within the eyebox 62. Although the pupil 28a taken in the plane of FIG. 2A is intended to be located at or near the entrance into the transmissive plate 40, the transmissive plate extends the pupil throughout its length so that the pupil 28a is also substantially located coincident with the pupil 68 of the viewer's eye 60 within the eyebox 62.

The beamlets 26, 26a, and 26b are injected into the transmissive plate 40 through a coupler 30, which is shown in FIGS. 3A and 3B in the form of a prism. The coupler 30, particularly as a prism, has an entrance face 32 oriented substantially normal to the optical axis 24 of the imaging lens 22 to limit further refraction of the beamlets 26, 26a, and 26b. In this regard, a transmissive body 34 of the coupler 30 preferably has a refractive index that matches a refractive index of a transmissive body 42 of the transmissive plate 40. The area of the entrance face 32 is sized larger than the transverse dimensions of the beamlets 26, 26a, and 26b in their orthogonal orientations.

The transmissive plate 40 includes an inner surface 44 and an outer surface 46 separated by a thickness "T". Preferably, the inner surface 44 and the outer surface 46 extend along a common length parallel to one another. As shown in the enlarged view of FIG. 4, a nominal propagating axis 38 of on-axis beamlet 26 is inclined at a substantial incidence angle "$\alpha_0$" to the inner and outer surfaces 44 and 46 to sustain internal reflections of the beamlet 26 between the inner and outer surfaces 44 and 46 along the length of the transmissive plate 40. For example, the nominal incidence angle "$\alpha_0$" can be larger than a critical angle required to achieve total internal reflection from the inner and outer surfaces 44 and 46 for all of the propagating beamlets 26, 26a, and 26b. The mechanism of total internal reflection requires the inner and outer surfaces 44 and 46 to be considered as interfaces between regions exhibiting substantially different refractive indices. To maximize this difference, the inner and outer surfaces 44 and 46 can be surrounded by air, and the transmissive body 42 of the transmissive plate 40 can be made of a high refractive index material including conventional optical glass (approximately 1.5) but preferably higher. Optical plastics, such as acrylic, polystyrene, and known copolymers can be used to other advantages. For example, such less expensive and lighter resin materials can be moldable for forming desired features into the transmissive plate 40 and for integrating the transmissive plate 40 into a larger structure, such as an eyewear frame and particularly a bridge.

Figure 4:
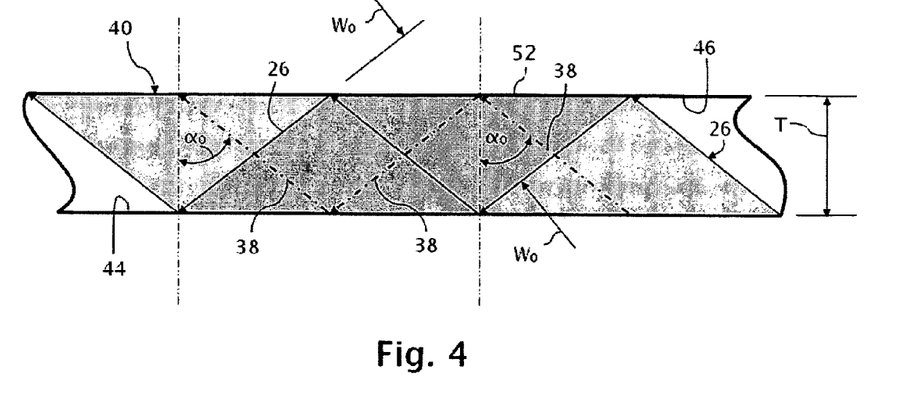
FIG. 4 is a further enlarged diagram of a conveyer section of the transmissive plate showing the propagation of a central beamlet along the plate.

The thickness "T" of the transmissive plate 40 is preferably set in relation to both the transverse width "$W_0$" of the propagating beamlet 26 and the nominal incidence angle "$\alpha_0$" of the beamlet 26 at the inner and outer surfaces 44 and 46 so that successive internal reflections of the beamlet 26 encounter substantially contiguous portions of the inner and outer surfaces 44 and 46. That is, the transmissive plate 40 is preferably dimensioned in thickness "T" so that reflections of all of the beamlets 26, 26a, and 26b do not leave excessive gaps or overlaps between the reflections along the length of the transmissive plate 40. At a nominal incidence angle "$\alpha_0$", the maximum thickness "T" for contiguous or otherwise uninterrupted reflections of the beamlet 26 at a transverse width "$W_0$" is given in the relationship below:

$$T \le \frac{W_O}{2\sin\alpha_O} \qquad (1)$$

As apparent from the comprehensive view of FIG. 1, the transmissive plate 40 includes along its length at least two different optical sections, including a conveyer section 52 and an ejector section 54. The conveyer section 52 functions largely as an optical waveguide for propagating the light beam 20 to the ejector section 54, but can also function as a window through which ambient light can be admitted into the expanded eyebox 62. The ejector section 54, which is aligned with the intended line of sight 64, functions as a beam folder, a beam expander, and a beamsplitter.

Figure 5:
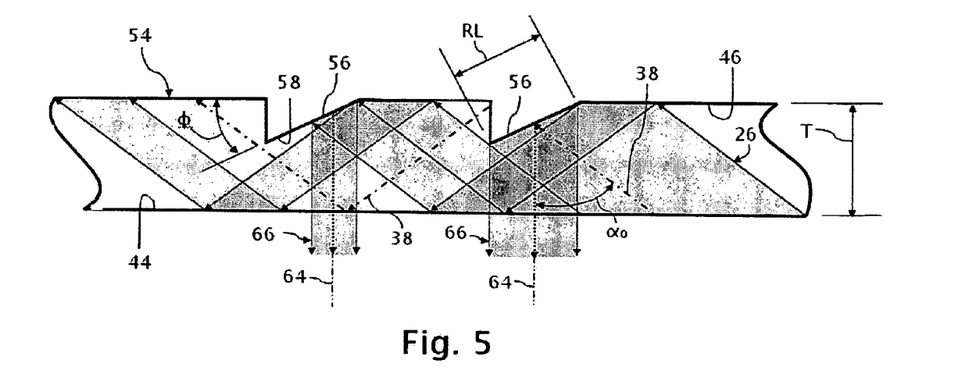
FIG. 5 is a similar further enlarged diagram of an ejector section of the transmissive plate showing the engagement of the central beamlet with two reflective facets located along the plate.

As shown in the enlarged view of FIG. 5, a plurality of reflective facets 56 within the ejector section 54 are formed through the outer surface 46 of the transmissive plate 40. The reflective facets 56 include specularly reflective surfaces 58 oriented at an inclination angle "$\phi$" to the outer surface 46. The inclination angle "$\phi$" required to eject portions 66 of the on-axis beamlet 26 of the light beam 20 out of the transmissive plate 40 along the line of sight 64 is equal to one-half of the nominal incidence angle "$\alpha_0$". Here, the line of sight 64 is taken normal to the inner and outer surfaces 44 and 46. The following relationship codifies this relationship as follows:

$$\phi = \frac{\alpha_O}{2} \qquad (2)$$

Figure 6:
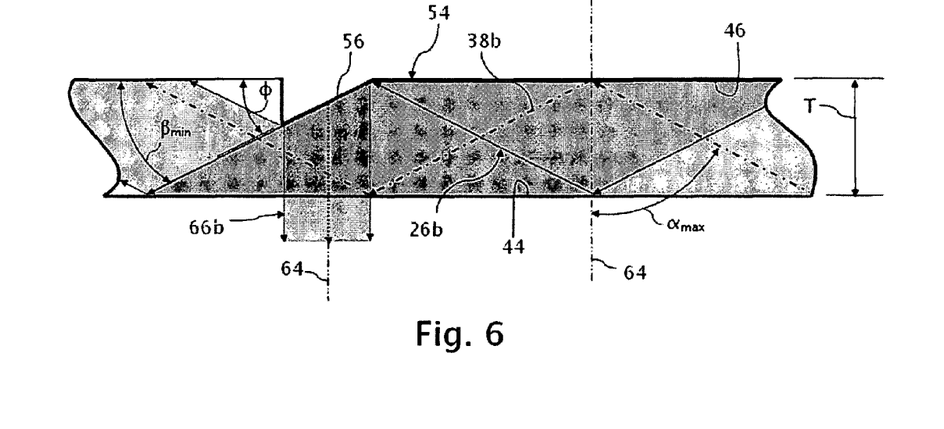
FIG. 6 is a similar further enlarged diagram of an ejector section of the transmissive plate showing a minimum grazing angle of a peripheral beamlet for avoiding unintended ghost reflections.

The above relationship assumes that the light rays incident upon the reflective facets 56 proceed directly from the inner surface 44. To avoid ghost reflections produced by unintended encounters of the reflective facets 56 with light rays reflected from the outer surface 46 of the transmissive plate 40, the inclination angle "$\phi$" is set, as shown in FIG. 6 no greater than a minimum grazing angle "$\beta_{min}$" at which a beamlet, such as the beamlet 26b, propagates along the transmissive plate 40. The minimum grazing angle "$\beta_{min}$" is a complement of the maximum incidence angle "$\alpha_{max}$" at which the same beamlet propagates along the transmissive plate 40. The following relationship codifies this relationship as follows:

$$\phi \le 90 - \alpha_{max} \qquad (3)$$

Together, the relationships (2) and (3) can be expressed as follows:

$$90 - \alpha_{max} \ge \phi = \frac{\alpha_O}{2} \qquad (4)$$

Assuming that the maximum incidence angle "$\alpha_{max}$" is no less than the nominal grazing angle "$\alpha_0$", then inclination angle "$\phi$" is no greater than 30 degrees and less than 30 degrees to the extent that the maximum incidence angle "$\alpha_{max}$" exceeds 60 degrees. For example, at a preferred inclination angle "$\phi$" of 26 degrees, the nominal incidence angle "$\alpha_0$" at which light is ejected along the normal line of sight 64 is 52 degrees, and the maximum incidence angle "$\alpha_{max}$" that avoids interference with the reflective facets 56 is 64 degrees.

Figure 7:
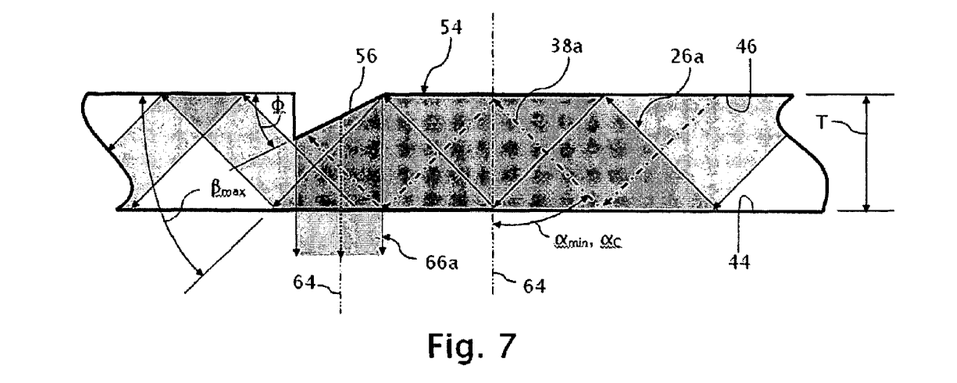
FIG. 7 is a similar further enlarged diagram of the ejector section of the transmissive plate showing a maximum grazing angle of a peripheral beamlet for propagating along the transmissive plate by total internal reflection.

Referring to FIG. 7, a minimum incidence angle "$\alpha_{min}$" at which a beamlet, such as the beamlet 26a, propagates along the transmissive plate 40, which is complementary to the maximum grazing angle "$\beta_{max}$", may be determined at least in part by the reflective characteristics of the inner and outer surfaces 44 and 46. For example, if a mechanism of total internal reflection is used to confine the beamlets 26a, 26b, 26c, and 26d within the transmissive plate 40, the minimum incidence angle "$\alpha_{min}$" is preferably not less than the so-called critical angle "$\alpha_c$" required to support total internal reflection. Across an interface modeled after Snells law, the critical angle is calculated as follows:

$$\alpha_C = \sin^{-1}\left(\frac{n_1}{n_2}\right) \quad (5)$$

where "$n_1$" is the refractive index of the less dense medium (e.g., air) on one side of the interface (e.g., the inner or outer surface 44 or 46) and "$n_2$" is the refractive index of the denser medium (e.g., the transmissive body 42) on the other side of the interface (e.g., the inner or outer surface 44 or 46). For example, an air/glass interface in a ratio of 1.56 leads to a critical angle "$\alpha_c$" of 40 degrees, so that at least theoretically, a maximum range of incidence angles ($\alpha_{max}$-$\alpha_{min}$) distinguishing the beamlets 26a and 26b at the margins of the imaging aperture can range from 64 degrees to 40 degrees. Given a nominal incidence angle "$\alpha_0$" of 52 degrees for the on-axis beamlet 26 intended for alignment with the normal line of sight 64, an angular field of view of 24 degrees is provided.

The reflective characteristics of the inner and outer surfaces 44 and 46 can be varied by modifications to the surfaces 44 or 46 and the light beam 20. For example, the polarization characteristics of the light beam or optical characteristics of the two surfaces 44 and 46 can be can be controlled to influence the critical angle "$\alpha_c$". Angularly sensitive reflective coatings can be applied to one or both of the inner and outer surfaces 44 and 46 to influence both the reflectivity and transmissivity of the surfaces as a function of incidence angle. For example, coatings can be provided that favor the reflection of oblique incidence over normal incidence to confine the light beam within the transmissive plate 40 until segments of the beam are reflected to a lower angle of incidence with respect to the inner surface boundary. The outer surface 46 can be made more reflective than the inner surface 44 by extending the range of incidence angles reflected by the outer surface 46. For immersive designs of headgear, the outer surface 46 can be made fully reflective.

Each of the reflective facets 56 includes a reflective surface that is preferably specularly reflective, planar, and inclined to a common inclination angle "$\phi$" so as to function as displaced segments of a single plane mirror. As shown in FIGS. 4 and 5, the reflective surfaces 58 are preferably sized to reflect only a portion of the transverse area of each of the beamlets 26, 26a, and 26b so that each of the beamlets 26, 26a, and 26b is segmented and ejected from the transmissive plate 40 through a range of positions along the length of the transmissive plate 40.

A minimum spacing between the reflective facets 56 along the length of the transmissive plate 40 is preferably set so that light from at least two of the reflective facets 56 has the potential to reach the viewer's eye at each position within the eyebox 62. The reflective surfaces 58 of the reflective facets 56 preferably have a ramp length "RL" in the illustrated plane of propagation (see FIG. 5) of between approximately 0.5 millimeters and 2 millimeters and extend through the plate 40 an orthogonal direction at a ramp breadth "RW" (see FIG. 8B) of approximately 25 millimeters.

Orienting the transmissive plate 40 so that its length in the general direction of beam propagation extends in a horizontal or interpupillary plane of the viewer, the ramp breadth "RW" extends in an orthogonal direction in a corresponding vertical plane. The segmented portions of the individual beamlets 26, 26a, and 26b reflected by adjacent reflective facets 56 are preferably spaced apart by an amount that is less than the nominal pupil size of the viewer's eyes.

Figure 8A:
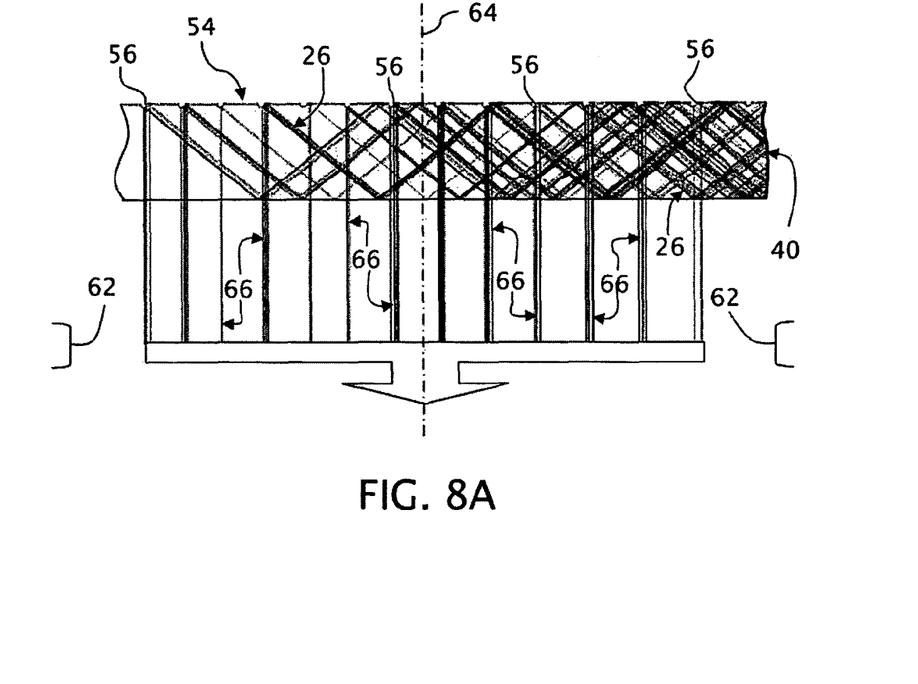
FIGS. 8A and 8B are relatively enlarged diagrams of the transmissive plate in orthogonal axial planes showing an arrangement of reflective facets for ejecting the light into an expanded eyebox.
Figure 8B:
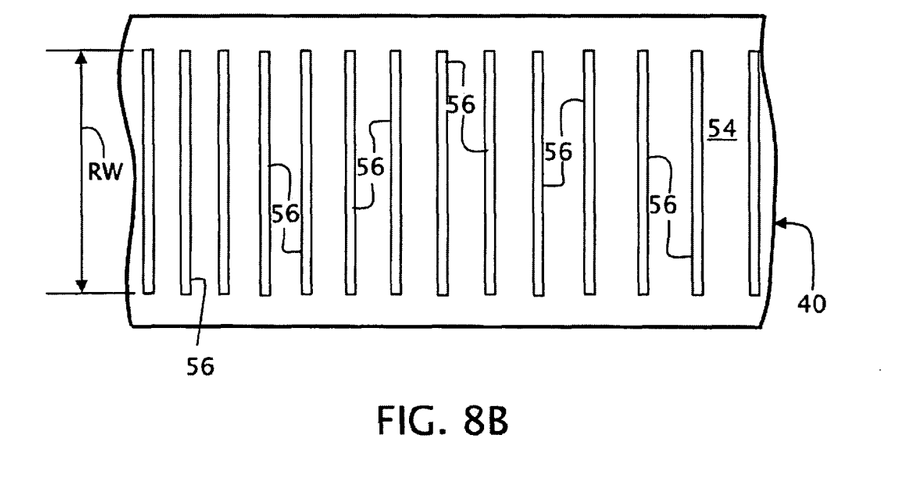

As shown in FIG. 8A, the spacing between the reflective facets 56 preferably decreases along the length of the transmissive plate 40 in the direction of beam propagation to balance the distribution of light within the eyebox 62. In addition to or as an alternative to varying the spacing between the reflective facets 56, the size of the reflective facets 56, particularly the ramp length RL of the reflective facets 56 can be progressively varied along the length of the transmissive plate 40 to balance light distributions within the eye box 62. Higher order variations in the sizing or spacing of the reflective facets 56 can also be made for particular purposes, including distributing energy of the ejected beamlets 66 more evenly throughout the eyebox 62 or optimizing viewing performance with a limited portion of the eyebox 62. Variations in the reflectivity of the reflective surfaces 58 or the areas of the ramp length RL occupied by the reflective surfaces 58 can also be varied to control the ejection of light from the transmissive plate 40.

The transmissive plate 40 for propagating and ejecting beamlets 26, 26a, and 26b is preferably transmissive in a normal direction (i.e., perpendicular to its inner and outer surfaces 44 and 46 to provide optional views of the viewer's environment. The transmissive plate 40 is also preferably arranged to occupy the central portion of the viewer's field of view but can be arranged to provide banner information closer to the viewer's peripheral field of view. In this regard, a central portion of the plate can be used for other purposes while the peripheral portion displays information in the form of virtual images.

Figure 9:
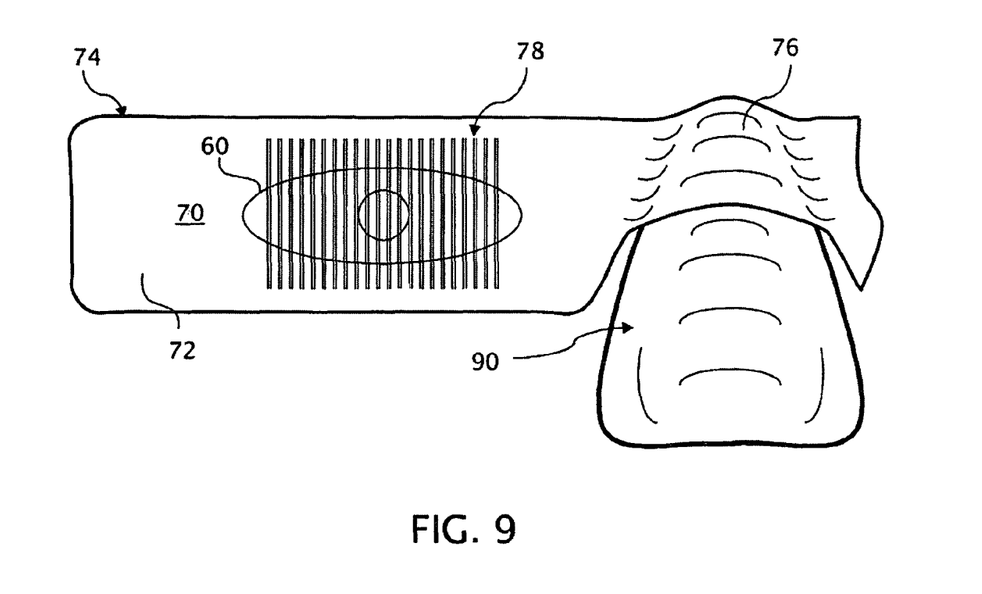
FIG. 9 is a front view of a similar microdisplay incorporated into an eyewear frame.
Figure 10:
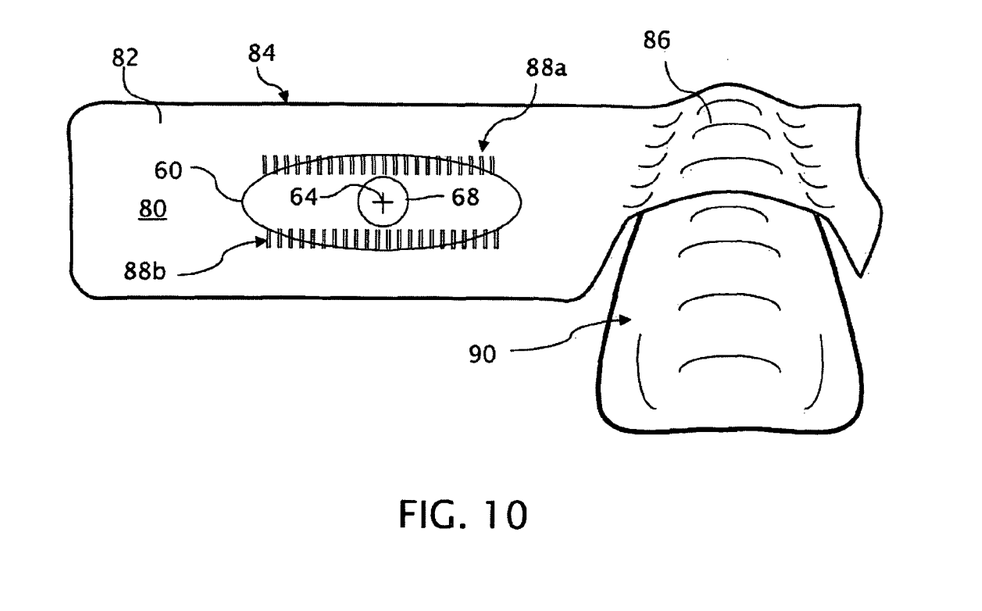
FIG. 10 is a similar front view of a microdisplay incorporated into an eyewear frame for presenting virtual images in the form of banner information to the viewer.

FIGS. 9 and 10 illustrate two alternative arrangements of transmissive plates 70 and 80 both as integral parts of molded resin bodies 72 and 82, each forming at least part of eyeglass frames 74 and 84, including bridges 76 and 86 for supporting the frames 74 and 84 from the viewer's nose 90. The transmissive plate 70 is structurally and functionally similar to the transmissive plate 40 for propagating and ejecting light through an array of reflective facets 78 in the form of virtual images visible to the viewer within the prescribed eyebox 62. The transmissive plate 80, however, is modified to arrange the reflective facets 88a and 88b in the form of strips or banners for presenting virtual images within peripheral portions of the viewer's field of view, such information for aiding in the performance of tasks.

The microdisplays 10 in accordance with the invention can also be supported or otherwise incorporated into other forms of eyewear including helmets, glasses, goggles, and other forms of immersive or non-immersive video eyewear. In addition, the transmissive plates can be modified in shape or material to provide optical power or other optical features, such as aberration control, while still providing for the propagation and spatially distributed output of the virtual image forming beamlets.

These and other variations in the implementation of the invention will become apparent to those of skill in the art consistent with the overall teaching of this invention.

The invention claimed is:

1. A microdisplay system comprising
   a microdisplay engine having individually addressable pixels that form a pattern within a light beam,
   a focuser for forming within the light beam a virtual image of the pattern produced by the microdisplay engine having an exit pupil through which light from the individually addressable pixels is substantially collimated in unique directions,
   a transmissive plate adapted to receive the light beam and having inner and outer surfaces separated by a thickness for propagating the light beam between the inner and outer surfaces along a length of the transmissive plate by internal reflection, and
   a plurality of reflective facets spaced apart from each other along the length of the transmissive plate and relatively sized in reflective area for reflecting different transverse sections of the substantially collimated light from the individually addressable pixels through the inner surface of the transmissive plate for extending an eyebox within which the virtual image is viewable, the reflective facets being formed through the outer surface of the transmissive plate and being provided with a coating to reflect the substantially collimated light from the individually addressable pixels.

2. The microdisplay system of claim 1 in which the coating is at least one of a metalized coating and an angularly sensitive coating that reflects light through a range of angles at which the substantially collimated light from the individually addressable pixels is incident upon the coating.

3. A microdisplay system comprising
   a microdisplay engine having individually addressable pixels that form a pattern within a light beam,
   a focuser for forming within the light beam a virtual image of the pattern produced by the microdisplay engine having an exit pupil through which light from the individually addressable pixels is substantially collimated in unique directions,
   a transmissive plate adapted to receive the light beam and having inner and outer surfaces separated by a thickness for propagating the light beam between the inner and outer surfaces along a length of the transmissive plate by internal reflection,
   a plurality of reflective facets spaced apart from each other along the length of the transmissive plate and relatively sized in reflective area for reflecting different transverse sections of the substantially collimated light from the individually addressable pixels through the inner surface of the transmissive plate for extending an eyebox within which the virtual image is viewable, and
   the outer surface of the transmissive plate being reflective through a greater range of grazing angles than the inner surface of the transmissive plate to prevent light propagating along the length of the transmissive plate from escaping through the outer surface of the transmissive plate.

4. The microdisplay system of claim 3 in which
   (a) the substantially collimated light from the individually addressable pixels internally reflects from the inner surface of the transmissive plate at a first range of incidence angles,
   (b) the reflective facets reflect the different transverse sections of the substantially collimated light from the individually addressable pixels along a path through the inner surface of the transmissive plate at a second range of incidence angles, and
   (c) the inner surface is coated with an angularly sensitive coating that contributes to the reflection of light from the inner surface within the first range of incidence angles and contributes to a transmission of light through the inner surface within the second range of incidence angles.

5. The microdisplay system of claim 3 in which the outer surface of the transmissive plate is coated with an angularly sensitive coating that contributes to the reflection of light from the outer surface within the first range of incidence angles and contributes to the transmission of light through a lower range of incidence angles for providing a transmissive pathway through the transmissive plate.

6. A display platform for orienting a virtual image in alignment with a viewer's eye comprising
   a transmissive plate having inner and outer surfaces separated by a thickness of the transmissive plate and extending along a length of the transmissive plate,
   the transmissive plate being adapted to receive a light beam conveying the virtual image into the transmissive plate for propagation by internal reflection between the inner and outer surfaces of the transmissive plate along the length of the transmissive plate,
   a plurality of reflective facets for progressively interrupting the propagation of the light beam along the length of the transmissive plate and being inclined through an inclination angle with respect to the outer surface of the transmissive plate, and
   the reflective facets being offset from the inner surface of the transmissive plate and spaced apart from each other along the length of the transmissive plate for reflecting successive portions of the light beam in a direction that transmits the successive portions of the light beam through the inner surface of the transmissive plate for rendering the virtual image visible to the viewer,
   a coupler that injects the light beam through a considered range of grazing angles, each grazing angle within the considered range being low enough to support the internal reflection the light beam from at least one of the inner and outer surfaces, and
   the reflective facets interrupting the outer surface of the transmissive plate, and the inclination angle of the reflective facets with respect to the outer surface is no greater than a lowest of the grazing angles within the considered range so that internal reflections of the light beam from the outer surface do not encounter the reflective facets en route to the inner surface of the transmissive plate.

7. The display platform of claim 6 in which the inclination angle of the reflective facets is related to a nominal grazing angle of the light beam so that the portions of the light beam that encounter the reflective facets at the nominal grazing angle are reflected in a direction substantially along a normal to at least one of the inner and outer surfaces.

8. The display platform of claim 7 in which an interface at the inner surface of the transmissive plate exhibits a critical angle of incidence for supporting a total internal reflection of the light beam and the nominal grazing angle is no greater than a complement of the critical angle and no less than the inclination angle of the reflective facets.

9. The display platform of claim 7 in which the nominal grazing angle is not less than 30 degrees corresponding to a nominal incidence angle of not more than 60 degrees with respect to the normal to the outer surface.

10. The display platform of claim 7 in which a complement of the nominal grazing angle is approximately equal to two times the inclination angle of the reflective facets.

11. The display platform of claim 7 in which the inner and outer surfaces of the transmissive plate extend substantially parallel to maintain a substantially constant nominal grazing angle along the length of the transmissive plate.

12. A display platform for orienting a virtual image in alignment with a viewer's eye comprising
 a transmissive plate having inner and outer surfaces separated by a thickness of the transmissive plate and extending along a length of the transmissive plate,
 the transmissive plate being adapted to receive a light beam conveying the virtual image into the transmissive plate for propagation by internal reflection between the inner and outer surfaces of the transmissive plate along the length of the transmissive plate,
 a plurality of reflective facets for progressively interrupting the propagation of the light beam along the length of the transmissive plate and being inclined through an inclination angle with respect to the outer surface of the transmissive plate,
 the reflective facets being offset from the inner surface of the transmissive plate and spaced apart from each other along the length of the transmissive plate for reflecting successive portions of the light beam in a direction that transmits the successive portions of the light beam through the inner surface of the transmissive plate for rendering the virtual image visible to the viewer, and
 the refective facets being spaced apart by amounts that progressively decrease along the length of the transmissive plate in the direction of propagation.

13. A display platform for orienting a virtual image in alignment with a viewer's eye comprising
 a transmissive plate having inner and outer surfaces separated by a thickness of the transmissive plate and extending along a length of the transmissive plate,
 the transmissive plate being adapted to receive a light beam conveying the virtual image into the transmissive plate for propagation by internal reflection between the inner and outer surfaces of the transmissive plate along the length of the transmissive plate,
 a plurality of reflective facets for progressively interrupting the propagation of the light beam along the length of the transmissive plate and being inclined through an inclination angle with respect to the outer surface of the transmissive plate,
 the reflective facets being offset from the inner surface of the transmissive plate and spaced apart from each other along the length of the transmissive plate for reflecting successive portions of the light beam in a direction that transmits the successive portions of the light beam through the inner surface of the transmissive plate for rendering the virtual image visible to the viewer, and
 the reflective facets having areas that are specularly reflective and the areas of the facets progressively increase along the length of the transmissive plate in the direction of propagation.

14. A display platform for orienting a virtual image in alignment with a viewer's eye comprising
 a transmissive plate having inner and outer surfaces separated by a thickness of the transmissive plate and extending along a length of the transmissive plate,
 the transmissive plate being adapted to receive a light beam conveying the virtual image into the transmissive plate for propagation by internal reflection between the inner and outer surfaces of the transmissive plate along the length of the transmissive plate,
 a plurality of reflective facets for progressively interrupting the propagation of the light beam along the length of the transmissive plate and being inclined through an inclination angle with respect to the outer surface of the transmissive plate,
 the reflective facets being offset from the inner surface of the transmissive plate and spaced apart from each other along the length of the transmissive plate for reflecting successive portions of the light beam in a direction that transmits the successive portions of the light beam through the inner surface of the transmissive plate for rendering the virtual image visible to the viewer, and
 the reflective facets being variably spaced along the length of the transmissive plate and the reflective facets have specularly reflective areas that are variably sized along the length of the transmissive plate.

15. The display platform of claim 14 in which reflective facets are variably spaced and sized to reproduce the virtual image at a range of positions within an eyebox projecting from the inner surface of the transmissive plate.

16. The display platform of claim 15 in which a minimum spacing between the reflective facets along the length of the transmissive plate is set so that light from at least two of the reflective facets reaches the viewer's eye at each position within the eyebox.

17. The display platform of claim 14 further comprising a coupler having an entrance face sized in relation to the thickness of the transmissive plate so that successive internal reflections of the light beam encounter substantially contiguous portions of the inner and outer surfaces.

18. The display platform of claim 17 in which the entrance face of the coupler is oriented substantially normal to an instant propagating direction of the light beam incident upon the entrance face of the coupler and the reflective facets are oriented so that the light beam exits the inner surface of the transmissive plate substantially normal to an instant propagating direction of the light beam incident upon the inner surface of the transmissive plate.

19. The display platform of claim 18 in which both the coupler and the transmissive plate share a common refractive index.

20. The display platform of claim 14 in which the transmissive plate has a width that extends in the length direction of the transmissive plate and a height direction that extends normal to the width direction, and the reflective facets extend in the height direction of the plate.

21. The display platform of claim 20 in which a plurality of the reflective facets extend over different portions of the height of the transmissive plate.

22. The display platform of claim 14 in which the transmissive plate is formed as a part of a molded resin body that also forms a contiguous headgear frame for supporting the transmissive plate in a near-eye position.

23. The display platform of claim 22 in which the molded resin body includes a bridge for supporting the transmissive plate on the viewer's nose.

* * * * *